Dec. 11, 1928.
1,695,078
L. BARKER
AIRPLANE ADVERTISING DEVICE
Filed Feb. 4, 1928
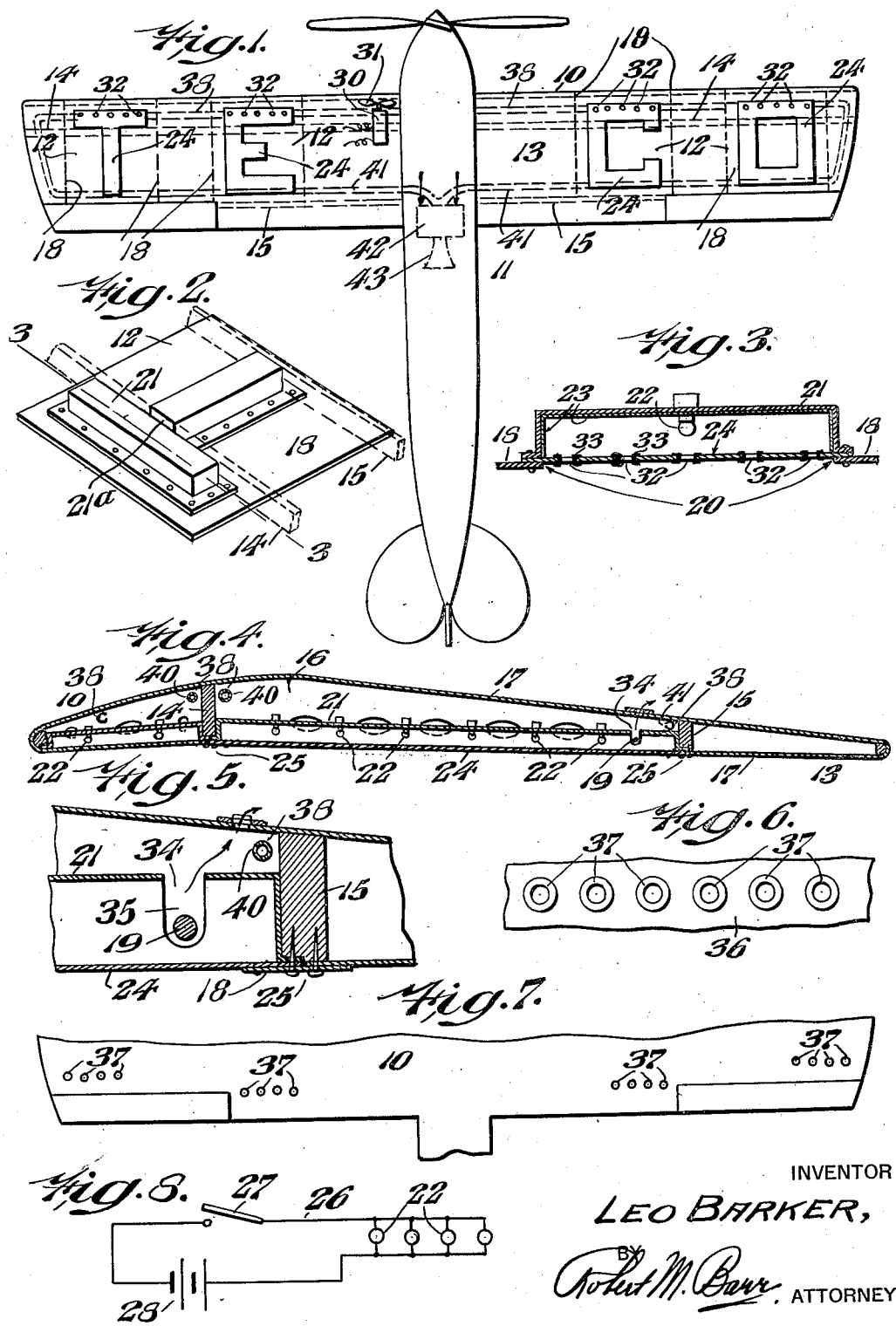
INVENTOR:
LEO BARKER,
BY
Robert M. Burr, ATTORNEY.

Patented Dec. 11, 1928.

1,695,078

UNITED STATES PATENT OFFICE.

LEO BARKER, OF WAYNE, PENNSYLVANIA, ASSIGNOR TO STARLIGHTERS, INC., OF PHILADELPHIA, PENNSYLVANIA, A CORPORATION OF DELAWARE.

AIRPLANE ADVERTISING DEVICE.

Application filed February 4, 1928. Serial No. 251,811.

The present invention relates to the art of illuminated advertising and more particularly to advertising by means of aircraft.

Some of the objects of the present invention are to provide a practical means of displaying illuminated characters upon the wing of an airplane, so that such characters will be clearly legible and distinguishable at all regulation flying altitudes; to provide an illuminated sign, letter or other character, which is so mounted and arranged upon the wing of an airplane as to be within the confines of such wing and leave the ordinary stream-line contour and wing surface unobstructed; to provide an illuminated mechanism which can be readily installed as a part of the exposed surface of the wing of any airplane without interrupting the original contour of such surface; to provide an automatic cooling means for preventing the heat from a lighting unit located in the wing of a plane from causing fire and fire damage; to provide an illuminated display device for airplanes comprising a plurality of units, each of which consists of a character or characters to be displayed, an illuminating means and a supporting surface, the latter being arranged to be inserted in place of a removed section of wing surface and to be supported by the frame of the said wing; to provide a display device on the wings of airplanes whereby the outline of the characters or letters is clearly and sharply defined at any reasonable distance; to provide an airplane illuminating display device wherein the light rays are confined to a predetermined path and stray rays normally tending to blur the outline of the characters are automatically absorbed.

In the accompanying drawings, Fig. 1 represents a bottom plan of an airplane embodying one form of the present invention; Fig. 2 represents a perspective of one of the attachable illuminated units; Fig. 3 represents a sectional detail on line 3—3 of Fig. 2; Fig. 4 represents a section on line 4—4 of Fig. 1; Fig. 5 represents a fragmentary section showing the air exhausting ports; Fig. 6 represents a detail of one means for admitting air for cooling purposes; Fig. 7 represents a fragmentary plan of the upper wing surface showing the air exhaust ports; and Fig. 8 represents diagrammatically the lighting control circuit.

Referring to the drawings, one form of the present invention is shown as applied to the wing 10 of an airplane 11 and consisting of one or more units 12 which are arranged to be inset in the bottom surface 13 of the plane wing 10 in such a manner as to leave that surface uninterrupted and having its original contour. The wing 10 may be of any construction but in the present instance is of the skeleton frame type having longitudinally arranged spars 14 and 15 which are interconnected by suitably spaced transverse ribs 16, all of which is enclosed and covered by a treated or doped fabric 17. While referring to this covering as fabric, it will be understood that other material may be utilized for the wing covering and that the present invention is equally applicable to whatever fabric or material is employed.

Since the units 12 are generally similar in construction and differ only in the shape of the characters employed, the present description will be confined to but one of these units and like reference numerals will be applied to like parts in all. Generally considered, each unit consists of a sheet of material 18, such as aluminum or other opaque material suitable as a substitute for a section of the covering 17 of the wing, but having the required supporting rigidity, which is stamped or otherwise cut out to form an opening 20 having the shape of the letter or other character which is to be displayed upon a section of the wing. In order to support and enclose the lighting elements so that the contour of the opening 20 is made readily visible, the sheet 18 carries an inverted receptacle 21 corresponding in shape to the opening 20 over which it is to fit. The depth of this receptacle 21 is such as to allow the proper positioning and mounting of one or more lamps 22 while its inner surface 23 when covered with a light absorbing paint will eliminate all reflection and glare and effectively absorb those rays which would otherwise be reflected and destroy the desired character outline. Following the installation of the illuminating medium within the receptacle 21, the opening 20 is closed by a panel 24 of non-inflammable transparent material, such as viscoloid, or other suitable transparent material having the necessary strength and durability to perform the same function as that of the covering of the wing which it has displaced. In assembling the unit, a section of the cover 17 of the lower surface of the wing corresponding in size to the sheet 18 is cut away and in its place the unit comprising the sheet 18, the receptacle 21 and transparent cover 24 is substituted. Those portions of the sheet 18 which are juxtaposed with respect to the spars 14 are rigidly made fast thereto by suitable fastening devices 25, while the marginal edges of the sheet 18 are tacked to the respective adjacent transverse ribs 16. In case the letter or character has a dimension greater than the distance between two adjacent spars, such as 14 and 15, the receptacle 21 is recessed as shown at 21ᵃ, Fig. 4, so that it interfits snugly with the bottom of the spar which it has to pass and in this way allows a letter or character of the largest possible size to be used. This construction is also shown in Fig. 2 where the dotted lines indicate the relative positions of the spars to which the unit is fastened. After the unit is made fast, its marginal edges are overlapped with the wing covering material and doped securely in place by the ordinary doping cement. In this way, the unit is fixed within the lower face of the wing with the sheet 18 forming an exact continuation of the lower surface of the wing and serving exactly the same purpose and function as did the section of wing covering which was removed to accommodate the unit.

For the purpose of illuminating the transparent panel 24, ordinary electric light bulbs are here shown as one way of accomplishing this end, but it will be understood that any other illuminating means may be provided (such, for example, as glow tubes) without departing from the invention. The lamp or lamps 22 are in a circuit, the conducting wires 26 of which lead to a control switch 27 conveniently located on or in close proximity to the instrument board of the airplane, while a source of current is provided in the form of a storage battery 28. An additional or alternative source of current may be supplied to the circuit through the medium of a generator 30 located at a suitably exposed portion of the wing structure, and having a fan blade 31 arranged so as to be wind-driven when the plane is in flight. This generator 30 also serves to maintain the storage batteries fully charged and operated at all times.

In order to prevent the heat from the illuminating means from becoming excessive or rising to a temperature which might be a fire hazard, the receptacles 21, in one form of the invention, are each provided with a plurality of air inlet ports 32 in the form of grommets 33 pressed into the front portion of the transparent material 24, while the rear portion of the receptacle 21 is provided with outlets 34 into the body of the wing. In the present instance, these outlets 34 are formed by slots 35 in the receptacles 21 and aligned with the control rod 19, so that the latter has free clearance to perform its functions. To exhaust the air from the body of the wing, the upper wing covering is cut away at one or more places near its rear edge, and in place of the removed material there is inserted at each place a strip of covering fabric 36 having a plurality of grommets 37 therein so that communication is established at a number of points between the interior of the wing and the outside air. The strips of fabric 36 are doped into place in accordance with the ordinary practice. In connection with the location of these exhaust outlet strips, it should be noted that it is preferable to place them upon the upper wing surface where each will be subject to the vacuum produced when the plane is in flight, and consequently the effect is not only to induce a current of air through the receptacles 21 but also, and which is equally as important, to induce a current of air throughout the wing compartment so that the heat radiated from the receptacle becomes negligible and the chances of contained gases becoming ignited are eliminated.

Other means of cooling and ventilating the inside of the wing in which the receptacles 21 are located may consist in the provision of intake pipes 38 extending longitudinally of the respective wing chambers, each of which pipes is provided with intake ports 40 communicating with the wing chamber and all of said pipes leading to and communicating with a common exhaust pipe 41. The exhaust pipe or pipes discharge into an exhaust casing 42 which is open at its forward end to the entrance of air as the plane flies so that the air is drawn out of the pipes 41 and discharges through an outlet 43. By this system, a current of air is drawn through the casing 42 whenever the plane is in flight and thus causes a suction in the exhaust pipes 41, the effect of which is to draw the air within the wing into the pipes 38 and discharge it by way of the pipes 41 and exhaust outlet 43.

While illuminated advertising from the wing of an airplane has been heretofore proposed and attempts made to produce an apparatus for that purpose, none in so far as applicant is aware has been either successful or practical.

By the present invention, the defects and disadvantages of prior proposed structures are overcome and a complete unitary, operative apparatus devised whereby letters, characters, and the like can be legibly illuminated on the wing of a plane at all commercial altitudes and with an absence of blurring. Furthermore, by the provision of the provision of the individual unit construction of the letters and characters, the system of the present invention can be applied to the plane of a wing of any construction whatsoever without departure from the original aerofoil design and without change or interference with the internal rib or other construction of the wing. Also when the device of the present invention is installed, the wing curvature is precisely the same as it was before the device was added and in every respect the factor of safety remains the same including the element of fire hazard.

Having thus described my invention, I claim:

1. An illuminated device for airplanes comprising an airplane wing having an opening therein, a plate arranged to fit within said opening, said plate having an opening therein in the shape of a character, means to secure said plate in place to form an uninterrupted wing surface, a transparent cover for said character opening, a source of light for illuminating said cover, and means for absorbing all light rays except those to be transmitted directly through said cover from said source of light.

2. An illuminated device for airplanes comprising an airplane wing having an opening therein, a plate arranged to fit within said opening, said plate having an opening therein in the shape of a character, means to secure said plate in place to form an uninterrupted wing surface, a transparent cover for said character opening, a source of light for illuminating said cover, and means for causing air to circulate about said source of light.

3. An illuminated device for airplanes comprising an airplane wing having an opening therein, a plate arranged to fit within said opening, said plate having an opening therein in the shape of a character, means to secure said plate in place to form an uninterrupted wing surface, a transparent cover for said character opening, a source of light for illuminating said cover, and vacuum induced means for circulating air about said source of light.

4. An illuminated device for airplanes comprising a unit formed of a plate having an opening shaped to represent a predetermined character, a receptacle shaped to correspond to said character and having an open side aligned with said plate opening, and a transparent cover for the open side of said receptacle, a source of light located in said receptacle, an airplane wing means to secure said unit in said wing with its plate forming an uninterrupted continuation of the surface of the wing, and a light absorbing material on the surface of said receptacle exposed to said light.

5. An illuminated device for airplanes comprising a unit formed of a plate having an opening shaped to represent a predetermined character, a receptacle shaped to correspond to said character and having an open side aligned with said plate opening, and a transparent cover for the open side of said receptacle, a source of light located in said receptacle, an airplane wing means to secure said unit in said wing with its plate forming an uninterrupted continuation of the surface of the wing, and means to induce a circulation of air through said receptacle.

6. An illuminated device for airplanes comprising in combination an upper wing surface having a plurality of air outlets, a unit having a character shaped opening of transparent material arranged to fit within an opening in the lower surface of a wing to form an uninterrupted continuation of said lower surface, said transparent material having a plurality of air inlets, a source of light arranged to illuminate said material, and shielding means between said source of light and said upper wing surface having air passages therein.

7. An illuminated device for airplanes comprising a unit formed of a plate having an opening shaped to represent a predetermined character, a receptacle shaped to correspond to said character and having an open side aligned with said plate opening, and a transparent cover for the open side of said receptacle, a source of light located in said receptacle, an airplane wing means to secure said unit in said wing with its plate forming an uninterrupted continuation of the surface of the wing, and means to induce a circulation of air through the body of the wing and about said receptacle.

8. An illuminated device for airplanes comprising a unit formed of a plate having an opening shaped to represent a predetermined character, a receptacle shaped to correspond to said character and having an open side aligned with said plate opening, and a transparent cover for the open side of said receptacle, a source of light located in said receptacle, an airplane wing means to secure said unit in said wing with its plate forming an uninterrupted continuation of the surface of the wing, and means including perforated pipes located in the wing to induce a circulation of air about said receptacle.

Signed at Philadelphia, county of Philadelphia, State of Pennsylvania, this 3d day of February, 1928.

LEO BARKER.